Aug. 24, 1943.                L. R. GRANDY                2,327,419
              APPARATUS FOR TESTING ENGINE LUBRICATION
                  Filed April 30, 1942        9 Sheets-Sheet 3

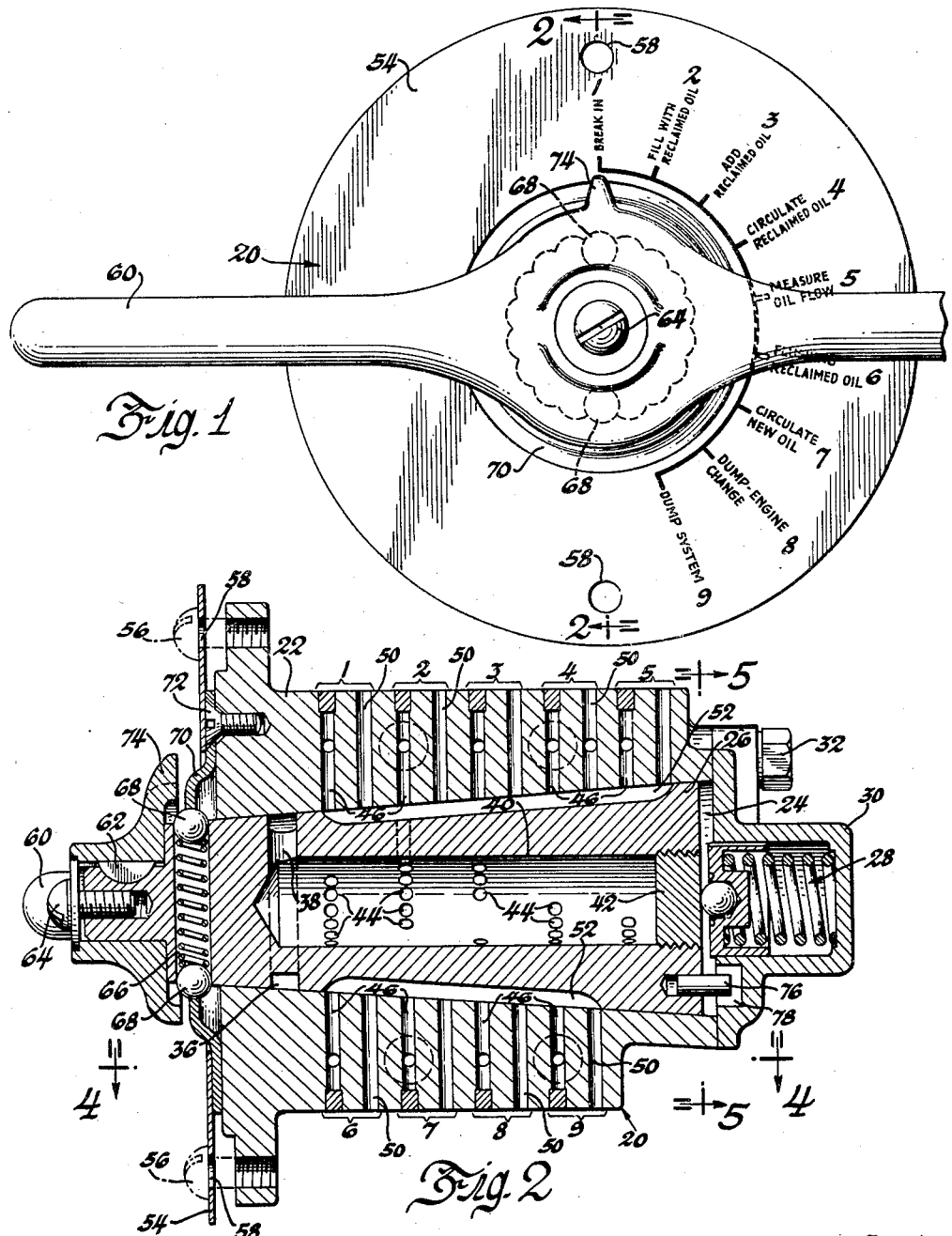

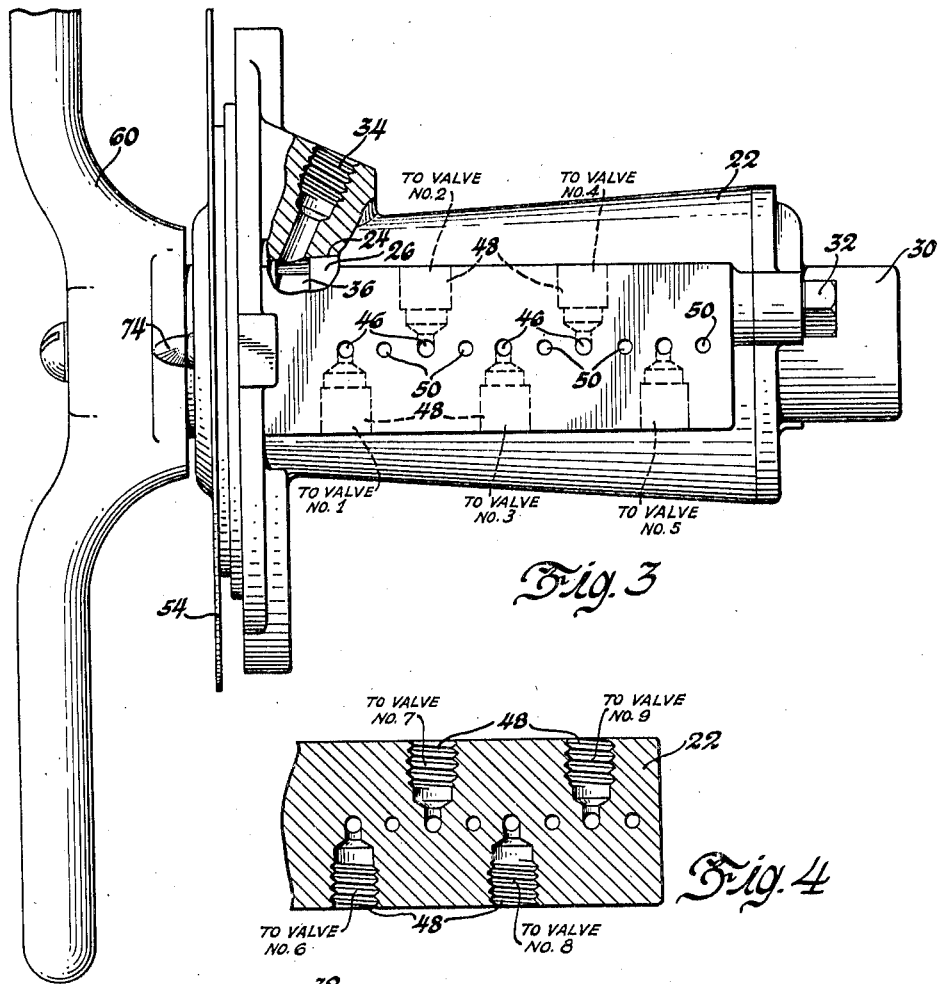
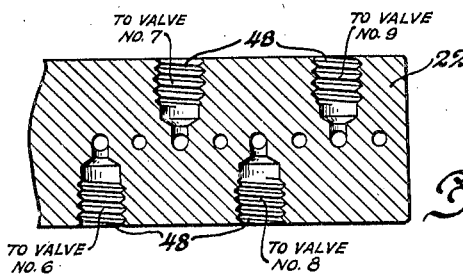
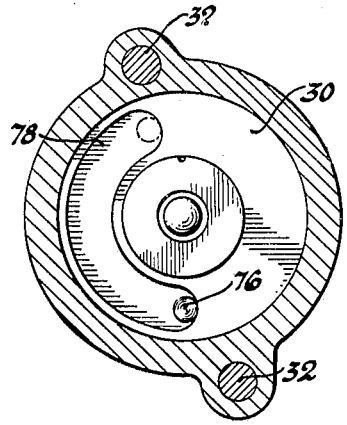

Inventor
Levi R. Grandy
By Blackmore, Spencer & Flint
Attorneys

Aug. 24, 1943.    L. R. GRANDY    2,327,419
APPARATUS FOR TESTING ENGINE LUBRICATION
Filed April 30, 1942    9 Sheets-Sheet 7

Inventor
Levi R. Grandy
By Blackmore, Spencer & Flint
Attorneys

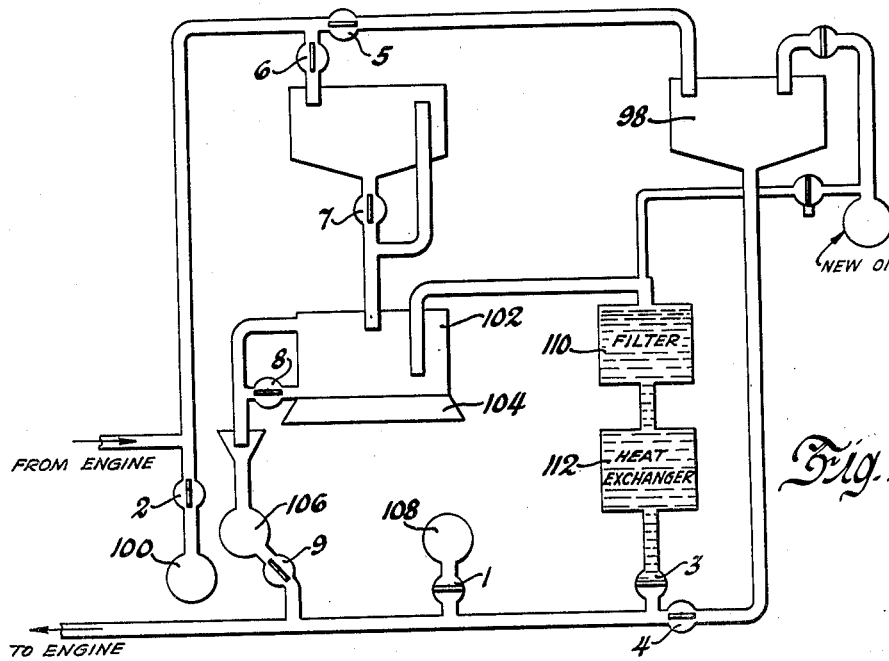
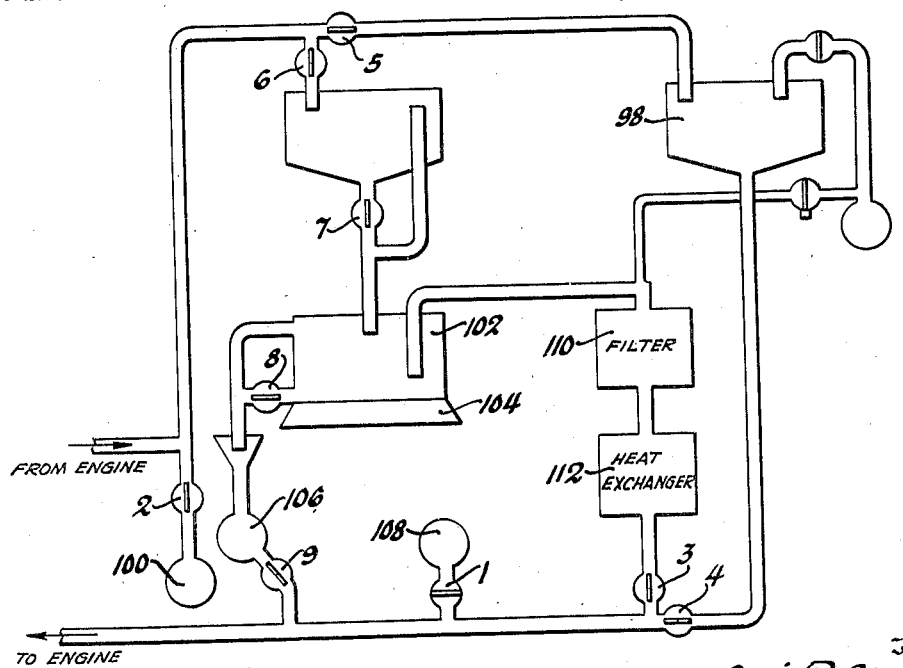

Patented Aug. 24, 1943

2,327,419

UNITED STATES PATENT OFFICE 2,327,419

APPARATUS FOR TESTING ENGINE LUBRICATION

Levi R. Grandy, River Forest, Ill., assignor to General Motors Corporation, Detroit, Mich., a corporation of Delaware Application April 30, 1942, Serial No. 441,121

3 Claims. (Cl. 73—51)

This invention relates to pipe or conduit systems provided with a plurality of valves to be opened or closed in different combinations and having a centralized control means by which selective combinations can be secured.

In the testing of engines for example, it is sometimes necessary to supply the engine with different kinds of lubricating oil, and to measure the amounts consumed by the engine.

It is very desirable that all the different conditions for supply and return of lubricating oil should be provided in a single system which can be readily coupled and uncoupled from the inlet and outlet of the lubricating system of the engine to be tested. This involves the use of a multiplicity of valves in the supply and return system, and for convenience as well as to preclude the possibility of wrong valves being opened or closed, it is desirable that the opening or closing of the valves should be automatic in response to the selective positioning of a single manual control means for the valves.

Such a single manual control means may actuate the valves through the agency of mechanical, electrical, or fluid pressure means, but whichever means is adopted it is very desirable that failure thereof should not result in the stopping of the supply of lubricating oil to the engine being tested.

The object of the invention is a lubricating oil supply and return system for an engine to be tested, said system providing for the supply of different kinds of lubricating oil to the engine for the measurement of the amount consumed by the engine, and for various other operational requirements, necessitating a plurality of alternative paths for the flow of oil to a conduit connected to the inlet of the engine lubricating system and from a conduit connected to the outlet of an engine lubricating system; said alternative path of flow being selectively connected to the inlet and outlet conduits through a plurality of valves adapted to be moved to different desired selections of closed and open positions by a single centralized control means.

Another object of the invention is a system of the foregoing kind in which the valves are moved from a normally closed to an open position or vice versa pneumatically by air under pressure, controlled by a single selector distributing valve.

A still further object of the invention is a system of the foregoing kind in which the normal position of the valves is such that a continuous supply of oil to the engine is assured in the event of failure of the supply of fluid pressure for moving said valves.

The foregoing and other objects of the invention will be apparent as the description proceeds.

According to the invention, the various valves of the lubricating oil supply and return system are pneumatically actuated by air under pressure which is distributed to a different selection of the valves in different positions of a selector distributing valve in a pneumatic control system for the valves.

The drawings show details of a system according to the invention for providing various conditions of supply and return of lubricating oil to and from an engine to be tested.

Figure 1 of the drawings shows the manually controllable means provided at the control station.

Figure 2 is a section substantially on line 2—2 of Figure 1.

Figure 3 is a top plan view of the central control valve.

Figure 4 is a view in section substantially on line 4—4 of Figure 2.

Figure 5 is a view in section of line 5—5 of Figure 2.

Figure 6:
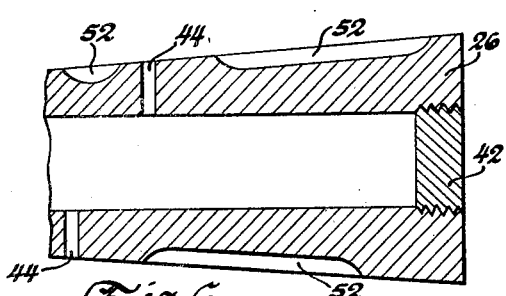

Figures 6 to 13 inclusive are views in section through the rotatable part of the control valve to show the arrangement of ports for the various positions of the control handle, in which Figure 6 shows the position for "fill with reclaimed oil."

Figure 7:
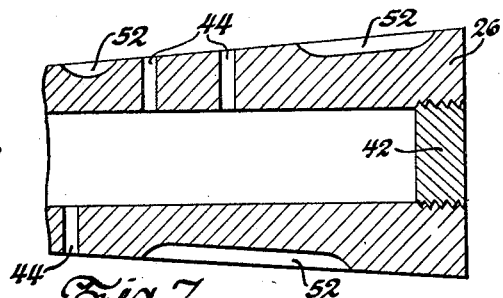

Figure 7 shows the position for "add reclaimed oil."

Figure 8:
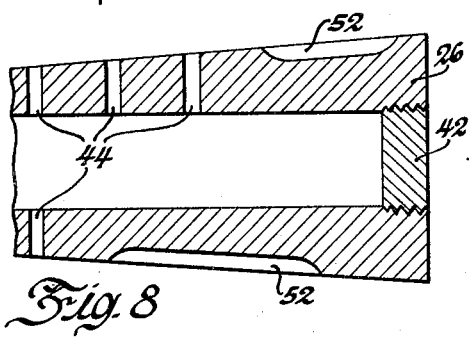

Figure 8 shows the position for "circulate reclaimed oil."

Figure 9:
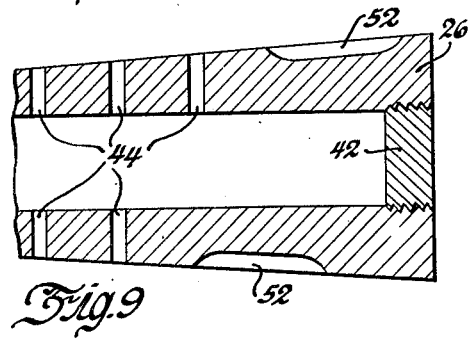

Figure 9 shows the position for "measure oil flow."

Figure 10:
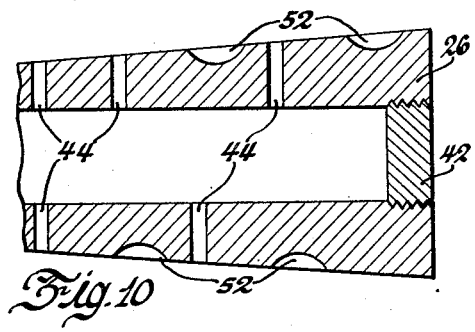

Figure 10 shows the position for "flushing reclaimed oil."

Figure 11:
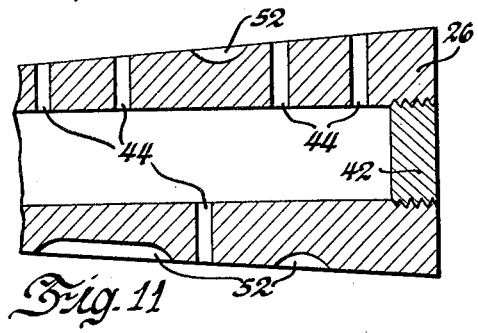

Figure 11 shows the position for "circulating new oil."

Figure 12:
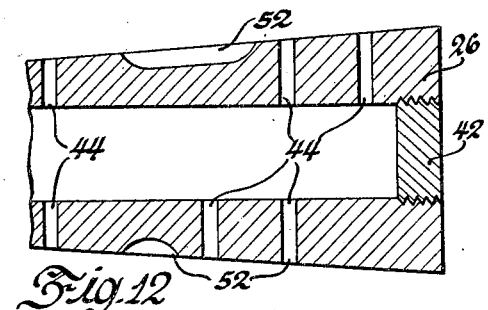

Figure 12 shows the position for "dump-engine change," and

Figure 13:
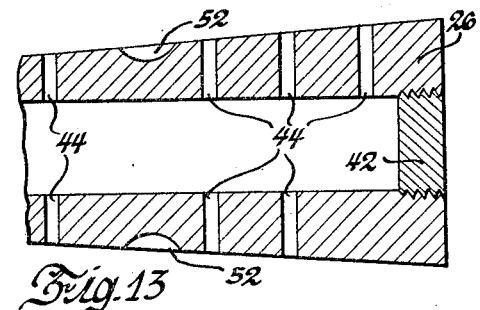

Figure 13 shows the position for "dump system."

Figure 14:
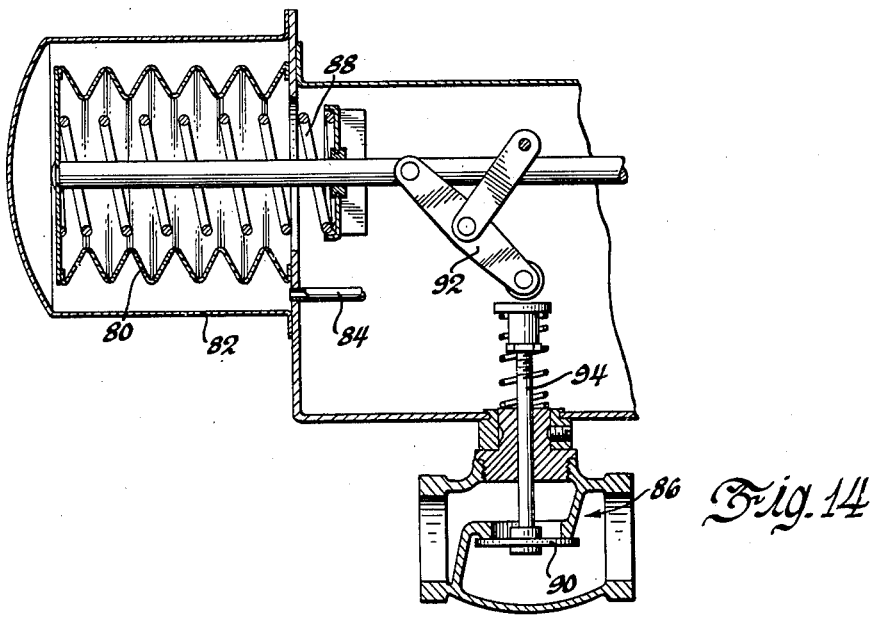
Figure 15:
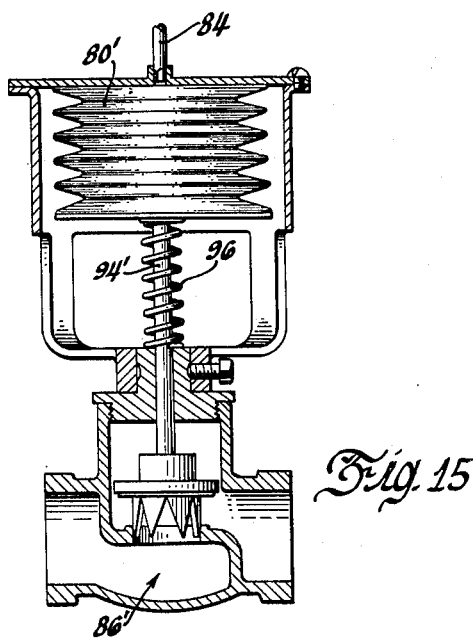

Figures 14 and 15 show two types of fluid motors which may be used to operate the oil flow control valves in the test installation of the invention.

Figure 16:
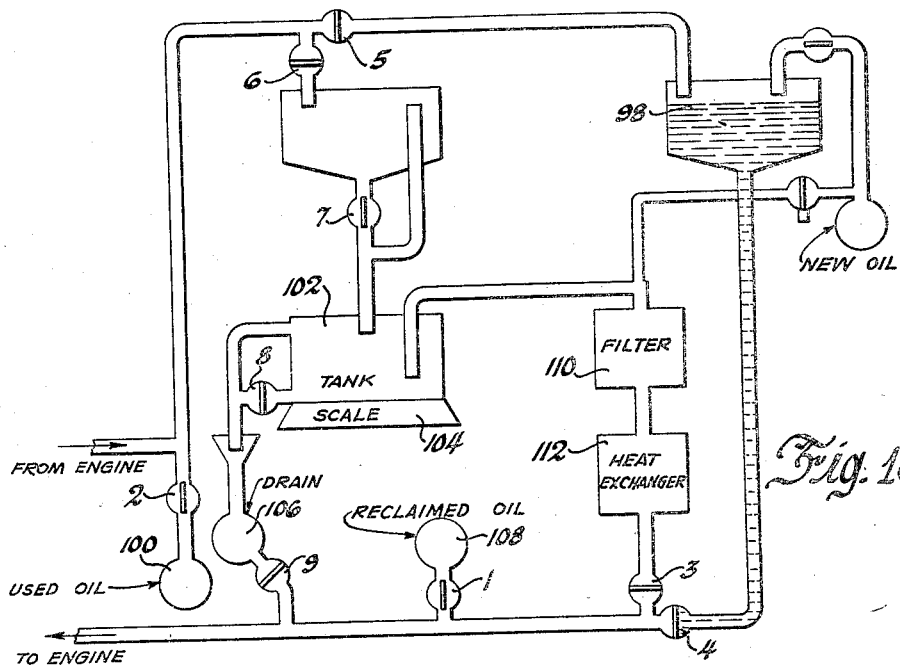

Figures 16 to 25 inclusive are diagrams of the lubricating oil system indicating the valves for control of oil flow and their positions for the various phases of operation, in which Figure 16 shows the system with all the valves in their "normal" position.

Figure 17:
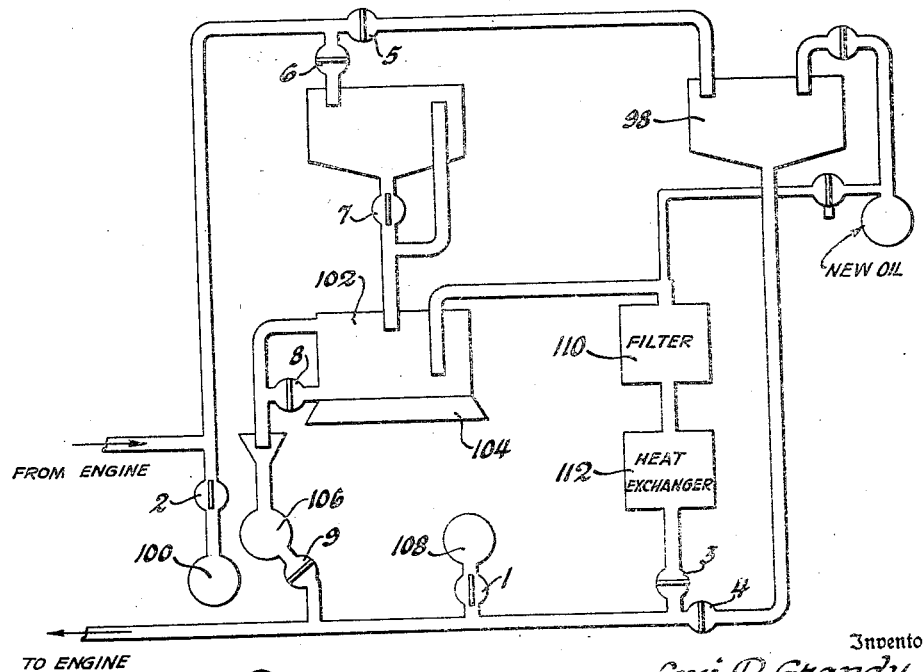

Figure 17 shows the valves for the position of "break-in." The positions of the oil flow control valves as shown in Figure 17 correspond to the position of the central control valve as shown in Figure 2.

Figure 18:
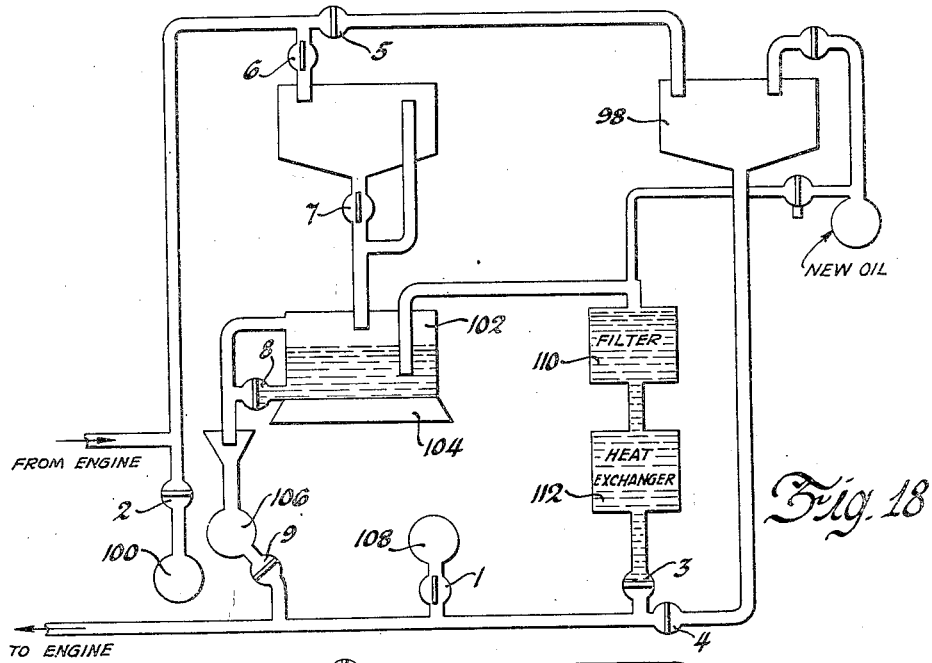

Figure 18 shows the position for "fill with reclaimed oil." Figure 18 corresponds with Figure 6.

Figure 19:
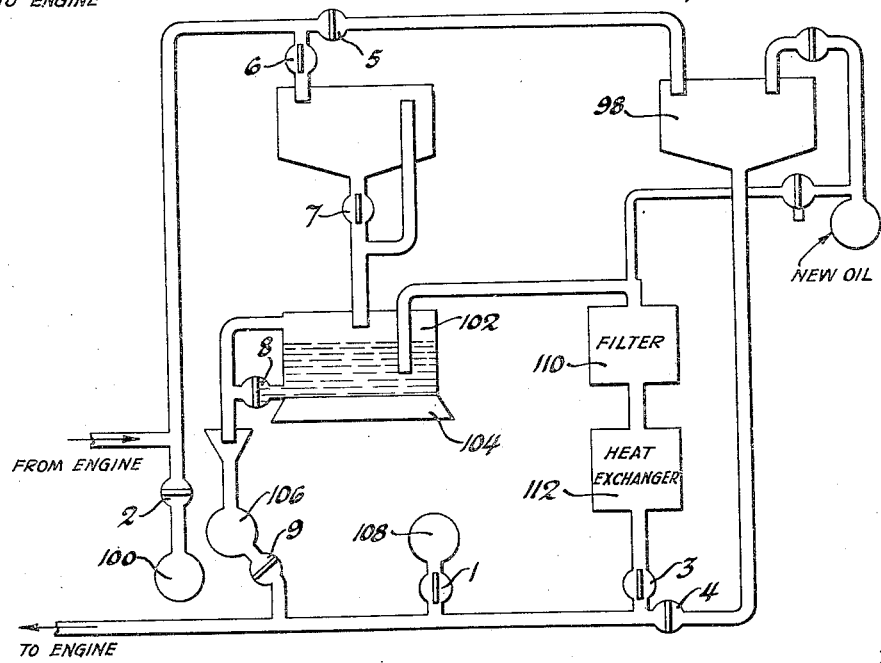

Figure 19 shows the positions of the oil valves to "add reclaimed oil." Figure 19 corresponds to Figure 7.

Figure 20:
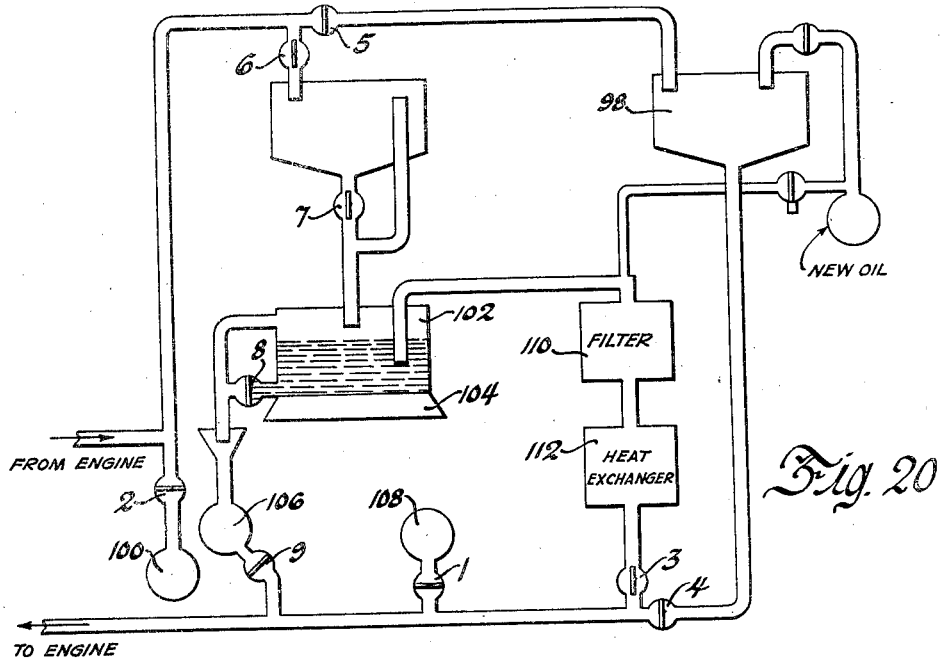

Figure 20 indicates the positions of the oil valves to "circulate reclaimed oil." This figure corresponds to Figure 8.

Figure 21:
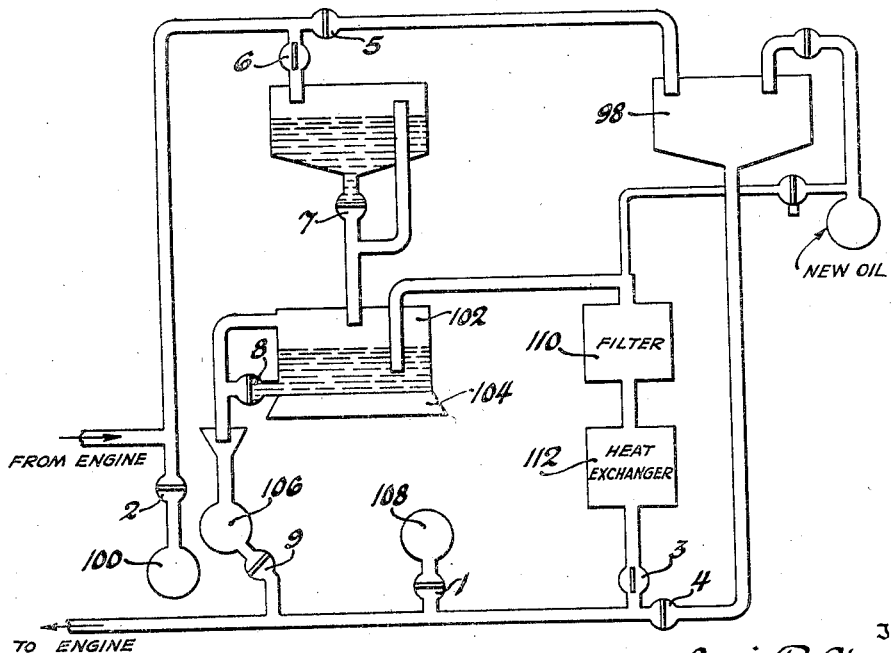

Figure 21 shows the position of the oil valves to "measure oil flow." Figure 21 corresponds to Figure 9.

Figure 22:
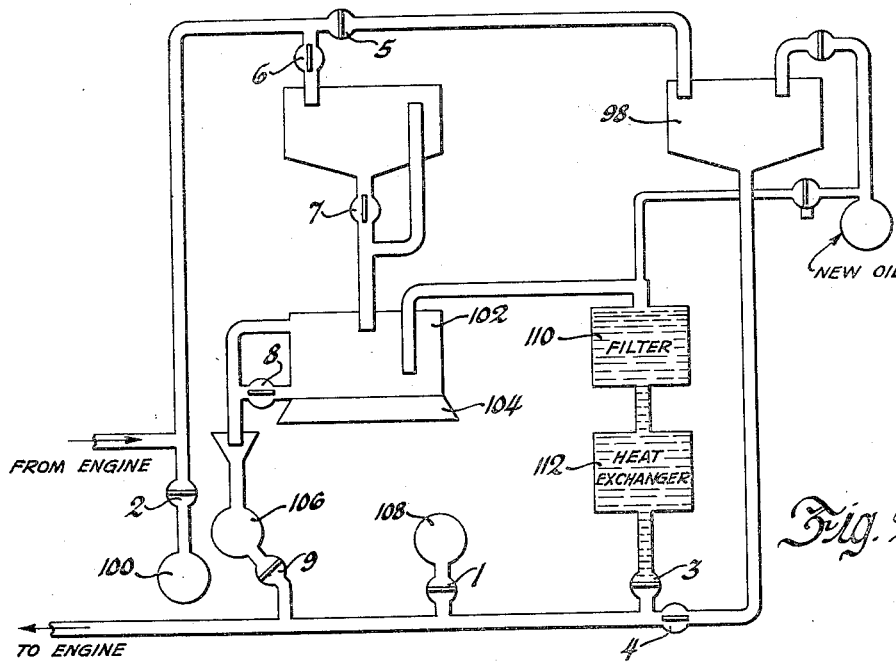

Figure 22 shows the oil valve positions for "flushing reclaimed oil." This figure corresponds to Figure 10.

Figure 23:
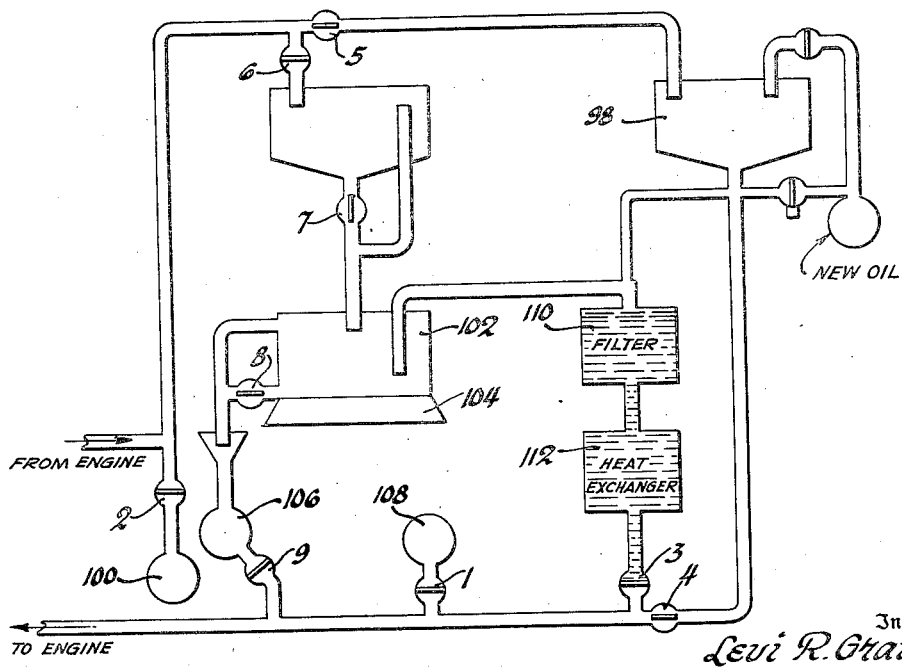

Figure 23 shows the oil valve positions to "circulate new oil." This figure corresponds to Figure 11.

Figure 24 shows the oil valve positions for "dump-engine change." This figure corresponds to Figure 12, and Figure 25 shows the oil valve positions to "dump system." The positions of the oil flow control valves as shown in Figure 25 correspond to the operating position of the rotatable part of the control handle as shown in Figure 13.

Referring now to Figures 1 to 5 in particular, 20 indicates generally the selector distributing valve which is disposed at the central control station. The control station will be so located as to be readily accessible to the operator.

Selector distributing valve 20 comprises a stationary block or body portion 22 having a conical bore 24. Rotatably disposed in bore 24 is a plug 26 having the general form of a truncated cone. Plug 26 is biased into tight fitting cooperation with body portion 22 in opening 24 by means of a spring-and-ball assembly indicated generally by 28 retained in back cover plate 30. Cover plate 30 is held in place on body portion 22 by means of one or more cap screws 32.

Body portion 22 is tapped as shown at 34 in Figure 3 for connection to a suitable supply of air under pressure (not shown). Screw threaded passage 34 extends all the way into the conical passage 24, as shown, and communicates with a peripheral channel or groove 36 formed in plug 26. Groove 36 communicates by way of a short passage 38 in plug 26 with a central opening 40 in plug 26. Opening 40 is closed off at its rear by a member 42 which has threaded engagement with plug 26. Leading from passage 40 in plug 26 to its periphery at various points are numerous passageways 44. Plug 26 can be turned to make passages 44 register with corresponding passages 46 in body portion 22, as will be hereinafter more fully explained. Tapped passages 48 provide threaded engagement of body portion 22 with fluid pressure lines, not shown, through which compressed air is led to the motors which operate the lubricating oil flow control valves.

For some phases of the operation of the valve control, the valve motors will not have fluid pressure applied to them, but will at such times be vented to the atmosphere. This venting to atmosphere is provided by means of vent passages 50 in body portion 22 which have communication with passage 46 through channels 52 provided in plug 26. Channels 52 will be disposed in plug 26 about its conical surface in such a manner as to provide venting to the atmosphere as desired. Therefore, whether a valve motor is vented to atmosphere or has fluid pressure applied thereto will be determined by the position of plug 26 in opening 24 of body portion 22.

The passages 46 and 50 relating to the various motors of the oil flow control valves have in Figure 2 been grouped and numbered 1 to 9 to indicate correspondence with the oil valves so numbered.

What the various operating positions are is shown by the markings on an indicator plate 54 which may be secured to body portion 22 by means of screws 56 engaging openings 58 of plate 54. A handle 60 has non-rotative engagement with plug 26 by means of key 62 so as to permit the turning of plug 26 to any of its operating positions. Handle 60 may be held to plug 26 by means of screw 64. A diametral opening or passage 66 through plug 26 may be provided to contain any suitable holding means such as spring biased balls 68 which engage notched cooperating plate 70. Plate 70 may be secured to body portion 22 by one or more screws 72. Handle 60 is provided with a pointer 74 which registers with indicia on indicator plate 54 to show the operating position of the control valve. Plug 26 is provided with a pin 76 which engages arcuate slot 78 in cover plate 30 to insure that plug 26 may not be turned through a greater angle than is desired. See Figure 5.

The dispositions of pressure passages 44 and venting passages 52 in plug 26 for the various operating positions of the selector distributing valve are shown in Figures 6 to 13 inclusive. The positions shown in these figures will be more fully discussed further on in connection with the rest of the system.

Figure 14 shows a fluid pressure motor for a valve such as may be used in this invention. The motor comprises simply a spring-biased bellows 80 in a fluid tight housing 82. Communication to housing 82 is had by means of a fluid pressure conduit 84. As will be understood by those skilled in the art, conduit 84 is connected directly to one of threaded passages 48 in body portion 22 of the control valve. The oil flow control valve indicated generally by 86 as shown in Figure 14 is one which is normally closed. When fluid pressure is admitted to housing 82 through conduit 84, bellows 80 is compressed against the bias of spring 88 and valve disc 90 is moved away from its seat through the linkage 92 and valve stem 94.

In Figure 15 there is shown a similar fluid pressure motor applied to an oil flow control valve 86' which is shown as normally open. In Figure 15 a bellows 80' is directly connected to valve stem 94'. Fluid pressure conduit 84 communicates in this instance with the interior of bellows 80' to expand the bellows against the bias of spring 96, closing the valve.

It will readily be understood by those skilled in the art that the valve motor shown in Figure 14 may be applied to normally open valves, and conversely, that the valve motor shown in Figure 15 may be applied to normally closed valves.

Figures 16 to 25 are lubricant circuit diagrams showing the position of the valves in different phases of operation of the system. In these figures there are indicated a new oil tank 98, a used oil drain 100, a scale tank 102 mounted on a weighing scale platform 104, a scale tank drain 106, a reclaimed oil tank 108, an oil filter 110, a heat exchanger 112 and the necessary connecting conduits, the valves which are operated by the automatic control means being numbered serially from 1-9.

Figure 16 shows the pneumatically operated valves 1–9 in their "normal" positions, i. e., the positions they assume when there is no pressure on the actuating motors and those motors are vented to the atmosphere. It will be seen that valves 1, 2, and 7 are normally open, being provided with valves of the type shown in Figure 15, while valves 3–6, 8, and 9 are provided with motors of the type shown in Figure 14.

In the following table I have indicated the correspondence of the number of the position in which control valve handle 60 is placed, with the name of the operation for that position, the condition of each valve as to whether it is under pressure or vented to the atmosphere, the figure showing the corresponding position of plug 26, and the figure showing the corresponding positions of the oil flow control valves. In the columns under the several valve numbers, "A" indicates that the valve motor for that position is vented to the atmosphere and "P" indicates that the valve motor for that position is under fluid pressure.

time sufficient for the new oil to flush out the system from valve 4 to valve 6.

Figure 23 shows the valves in position No. 7 for circulating new oil. It will be noted that reclaimed oil is at the same time being drained from the scale tank 102.

Figure 24 shows the valves in position No. 8 for emptying or dumping the system before unconnecting therefrom an engine which has been tested and connecting thereto another engine to be tested.

Figure 25 shows the valves in position No. 9 for emptying or dumping the complete system if the oil is so contaminated as to be unfit for further use.

It will be appreciated that in the event of failure of the supply of fluid pressure for moving the valves 1 to 9 and whatever the position of the selector distributing valve 20 may be, valves 1 to 9 will occupy their normal position, i. e., position No. 1 shown in Figure 17, with valves 1, 2 and 7 open and valves 3–6, 8 and 9 closed, providing a continuous flow of reclaimed oil from the tank

| Pos. No. | Operation | Valve number | | | | | | | | | Corresp. plug position | Corresp. circuit diagram |
|---|---|---|---|---|---|---|---|---|---|---|---|---|
| | | 1 | 2 | 3 | 4 | 5 | 6 | 7 | 8 | 9 | | |
| 1 | Break in | A | A | A | A | A | A | A | A | A | Fig. 2 | Fig. 17. |
| 2 | Filling system with reclaimed oil | A | P | A | A | A | P | A | A | A | Fig. 6 | Fig. 18. |
| 3 | Adding reclaimed oil to system | A | P | P | A | A | P | A | A | A | Fig. 7 | Fig. 19. |
| 4 | Circulating reclaimed oil | P | P | P | A | A | P | A | A | A | Fig. 8 | Fig. 20. |
| 5 | Measuring oil flow | P | P | P | A | A | P | A | A | A | Fig. 9 | Fig. 21. |
| 6 | Flushing reclaimed oil out with new oil | P | P | P | A | A | P | P | A | A | Fig. 10 | Fig. 22. |
| 7 | Circulating new oil | P | P | A | P | A | P | A | P | A | Fig. 11 | Fig. 23. |
| 8 | Dumping system for engine change | P | A | A | P | P | P | A | P | A | Fig. 12 | Fig. 24. |
| 9 | Dumping complete system | P | A | P | P | P | P | A | P | P | Fig. 13 | Fig. 25. |

The above table shows that in the No. 1, or "Break in" position of Figure 17, the pneumatically operated valves all occupy their "normal" positions, i. e., valves 1, 2, and 7 are open and valves 3–6, 8 and 9 are closed.

In this position, as shown, the oil pump of the engine lubricating system (which is conventional and not shown) draws reclaimed oil from the tank 108 and returns it to the used oil drain 100 after it has been circulated through the engine to lubricate the parts thereof.

Figure 18 shows the valves in position No. 2 for filling the system with reclaimed oil. The valves are left in the position shown in the figure until there is a predetermined amount of oil in the weight scale measuring tank 102.

Figure 19 shows the valves in position No. 3 for adding reclaimed oil to the system from the reclaimed oil tank 108. This position is used only if after running in position No. 4 shown in Figure 20, it is found necessary to add more oil to the system. The reading of the weight scale is recorded before and after this position is used in order to make the necessary correction in measuring the total oil consumption during the test.

Figure 20 shows the valves in position No. 4 for circulating reclaimed oil through the engine. The difference in the weight scale reading between start and finish is the amount of oil consumed during the period.

Figure 21 shows the valves in position No. 5 for measuring the rate of oil flow from the scale tank 102 over a given time or number of engine revolutions.

Figure 22 shows the valves in position No. 6 for flushing reclaimed oil out with new oil. This position of the valves is maintained a length of 108 to the engine, and out from the engine into the drain 100.

I claim:

1. In an engine testing system, a conduit for connection to the inlet of the engine lubricating system, a conduit for connection to the outlet from the engine lubricating system; valved connections from a new oil tank and a reclaimed oil tank respectively to the inlet conduit; valved connections from the outlet conduit to a used oil drain, a receiver for a scale tank mounted on a weighing scale platform, and the new oil tank respectively; a valved connection from the receiver to the scale tank, a valved connection from the scale tank to the inlet conduit, a valved connection from the scale tank to a drain, a valved connection from the drain to the inlet conduit, and a single centralized control means for said valves adapted to provide different desired selections of closed and open valves for various operational requirements of the system.

2. The combination according to claim 1 in which certain of said valves are provided with means holding them normally open, and others of said valves are provided with means holding them normally closed, said normally open and normally closed valves being adapted to be moved pneumatically by air under pressure into closed and open positions, respectively, and said single centralized control means being a selector distributing valve in a pneumatic control system for the valves.

3. The combination according to claim 1 in which the connection from the scale tank to the inlet conduit is through a filter and a heat exchanger.

LEVI R. GRANDY.